United States Patent
Anishetty

[19]

[11] Patent Number: 6,151,540
[45] Date of Patent: Nov. 21, 2000

[54] DYNAMIC OCCUPANT POSITION DETECTION SYSTEM AND METHOD FOR A MOTOR VEHICLE

[75] Inventor: Santosh Anishetty, Plymouth, Mich.

[73] Assignee: Delphi Technologies, Inc., Troy, Mich.

[21] Appl. No.: 09/309,848

[22] Filed: May 11, 1999

[51] Int. Cl.[7] .................................................. B60R 21/32
[52] U.S. Cl. ............................................ 701/45; 280/735
[58] Field of Search ..................... 701/45, 46; 280/734, 280/735; 180/272, 273; 307/10.1

[56] References Cited

U.S. PATENT DOCUMENTS

| | | | |
|---|---|---|---|
| 4,985,835 | 1/1991 | Sterler et al. | 701/46 |
| 5,330,226 | 7/1994 | Gentry et al. | 280/735 |
| 5,490,069 | 2/1996 | Gioutsos et al. | 701/45 |
| 5,785,347 | 7/1998 | Adolph et al. | 280/735 |
| 5,868,427 | 2/1999 | Mueller et al. | 280/806 |
| 5,906,393 | 5/1999 | Mazur et al. | 280/735 |
| 5,935,182 | 8/1999 | Foo et al. | 701/45 |

*Primary Examiner*—Michael J. Zanelli
*Attorney, Agent, or Firm*—Jimmy L. Funke

[57] ABSTRACT

An improved occupant position detection system and method in which a periodically updated position output of an occupant recognition system (ORS) is dynamically augmented for purposes of determining if the occupant is out-of-position (OOP) so as to inhibit or allow deployment of occupant restraints in a timely manner. Vehicle acceleration data developed by an accelerometer of the restraint system is double integrated to form an incremental occupant displacement value. The incremental displacement value is reset to zero each time the ORS updates its position output, and between updates is used to modify the last position output to provide a dynamic position value for OOP determination. If the occupant is not wearing a seat belt, the incremental displacement value is combined with the last ORS position output both prior to and during the crash event. If the occupant is wearing a seat belt, the incremental displacement value is combined with the last ORS position output so long as the measured acceleration level is below a threshold at which the seat belt should begin to exert a significant restraining force; if the measured acceleration is above the threshold, the seat belt tension is detected to determine if the belt is in fact restraining the occupant. If the belt is not restraining the occupant, the incremental displacement value is combined with the last ORS position output; if the belt is restraining the occupant, the last ORS position output is used for OOP determination.

12 Claims, 2 Drawing Sheets

DYNAMIC OCCUPANT POSITION DETECTION SYSTEM AND METHOD FOR A MOTOR VEHICLE

TECHNICAL FIELD

This invention relates to a motor vehicle occupant restraint system, and more particularly to a system and method for dynamically detecting the position of an occupant of the vehicle.

BACKGROUND OF THE INVENTION

Vehicle occupant recognition systems (ORS) are useful in connection with air bags and other pyrotechnically deployed restraints as a means of judging whether, and/or how forcefully, to deploy the restraint. Ideally, the system should be capable of classifying the type of occupant (i.e., large adult, small adult, child, etc.) and determining if the occupant is out-of-position relative to the point of deployment of the air bag. Various systems incorporating one or more infrared and/or acoustical ranging sensors have been proposed for this purpose; see, for example, the U.S. Pat. Nos. 5,330,226 and 5,785,347. In general, such systems emit one or more beams of infrared energy to define a corresponding number of viewing fields, and receive the reflected energy to detect the presence of an occupant within the viewing fields.

Typically, the ORS must have a high speed of response so that deployment can be properly inhibited or allowed when the occupant position quickly changes. However, such systems require a large amount of data to reliably perform the classification and position detection functions, and the update rate of the detected position is usually slower than desired for purposes of determining whether the occupant is out-of-position. Accordingly, what is needed is a control method for augmenting the discrete position measurements provided by the ORS so that deployment can be reliably inhibited or allowed in a more timely manner.

SUMMARY OF THE INVENTION

The present invention is directed to an improved occupant position detection system and method in which a periodically updated position output of an occupant recognition system (ORS) is dynamically augmented for purposes of determining if the occupant is out-of-position (OOP) so as to inhibit or allow deployment of occupant restraints in a timely manner. According to the invention, vehicle acceleration data developed by an accelerometer of the restraint system is double integrated to form an incremental occupant displacement value. The incremental displacement value is reset to zero each time the ORS updates its position output, and between updates is used to modify the last position output to provide a dynamic position value for OOP determination. If the occupant is not wearing a seat belt, the incremental displacement value is combined with the last ORS position output both prior to and during the crash event. If the occupant is wearing a seat belt, the incremental displacement value is combined with the last ORS position output so long as the measured acceleration level is below a threshold at which the seat belt should begin to exert a significant restraining force; if the measured acceleration is above the threshold, the seat belt tension is detected to determine if the belt is in fact restraining the occupant. If the belt is not restraining the occupant, the incremental displacement value is combined with the last ORS position output; if the belt is restraining the occupant, the last ORS position output is used for OOP determination.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
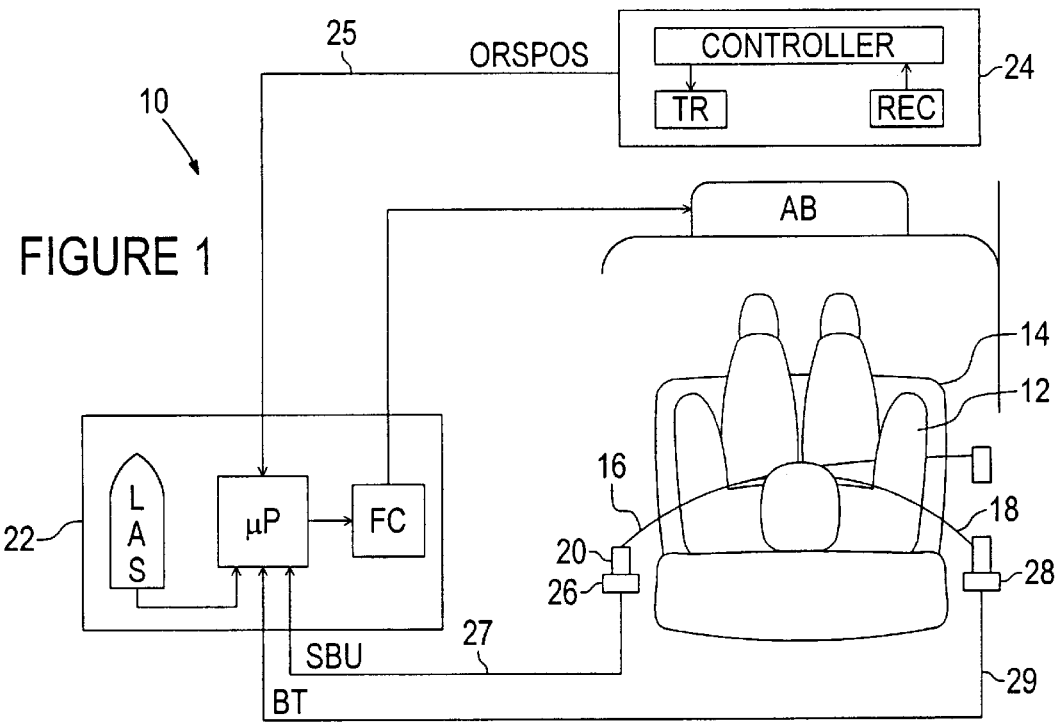
FIG. 1 is a block diagram of an occupant restraint system, including an occupant recognition system (ORS) and a microprocessor-based sensing and diagnostic module (SDM) according to this invention.

Referring to the drawings, and particularly to FIG. 1, the reference numeral 10 generally designates a vehicle supplemental restraint system in which one or more restraints, such as air bags AB, strategically located relative to the occupant 12 of a vehicle seat 14, are deployed in a severe crash event to protect the occupant 12. The vehicle is provided with conventional seat and shoulder belts 16, 18 which are typically joined at a clip (not shown) which is removably attached to anchor 20. Usually, the anchor 20 is located where shown in FIG. 1, but other locations (such as in the vehicle door frame) are also known.

A sensing and diagnostic module (SDM) 22 may be packaged as a single electronic module and mounted on a frame element in a central portion of the vehicle. Fundamentally, the SDM 22 includes a longitudinal acceleration sensor LAS for sensing longitudinal acceleration of the vehicle, a microprocessor $\mu P$ receiving the output signal of the LAS, and a firing circuit FC which is triggered by microprocessor $\mu P$ to deploy the air bags AB for occupant protection in the event of a severe crash. The microprocessor $\mu P$ also receives inputs from an occupant recognition system (ORS) 24, a seat belt detection sensor 26, and a seat belt tension sensor 28. The ORS 24 includes ranging elements such as the transmitter TR and the receiver REC located in the vehicle headliner or instrument panel for emitting and detecting infrared, acoustical or other energy beams, and a CONTROLLER coupled to the receiver REC and transmitter TR for the purpose of recognizing and determining the position of occupant 12 relative to the air bag AB. In the illustrated embodiment, the ORS 24 provides an occupant position output signal (ORSPOS) to microprocessor $\mu P$ on line 25. The seat belt detection sensor 26 may be conventional, and provides a seat belt usage signal (SBU) to microprocessor $\mu P$ on line 27 that indicates whether the belts 16, 18 are properly fastened to the anchor 20. The seat belt tension sensor 28 may also be conventional, and provides a belt tension signal (BT) to microprocessor $\mu P$ on line 29 indicating the amount of tension or restraining force applied by the shoulder belt 18.

In general, the SDM 22 analyzes the output of the LAS to determine the severity of a crash event, and to trigger the FC to deploy the air bag AB if the severity exceeds a predetermined threshold. However, deployment is inhibited if the occupant 12 is out-of-position (OOP) relative to the air bag AB, as judged by the position output signal of the ORS 24 relative to a predefined threshold. However, the position output signal is only updated as fast as the ORS CONTROLLER can process the data supplied by the receiver REC. The interval between updates can be significant, particularly if the occupant position is changing rapidly due to braking and/or the initiation of a crash event. The present invention addresses this issue by adjusting the position output signal between updates based on an incremental displacement signal determined by double integrating the filtered output ACCEL of the LAS. Since the update rate of the incremental displacement signal is much faster than that of the position output signal, the accuracy of the adjusted position signal in the interval between updates is significantly greater than the un-adjusted position signal, thereby affording significantly improved OOP determination. The influence of the seat belt system on occupant position is taken into account by the sensors 26 and 28 which respectively determine if the belts 16, 18 are in use, and if the belt 18 is exerting a significant restraining force.

Figure 2:
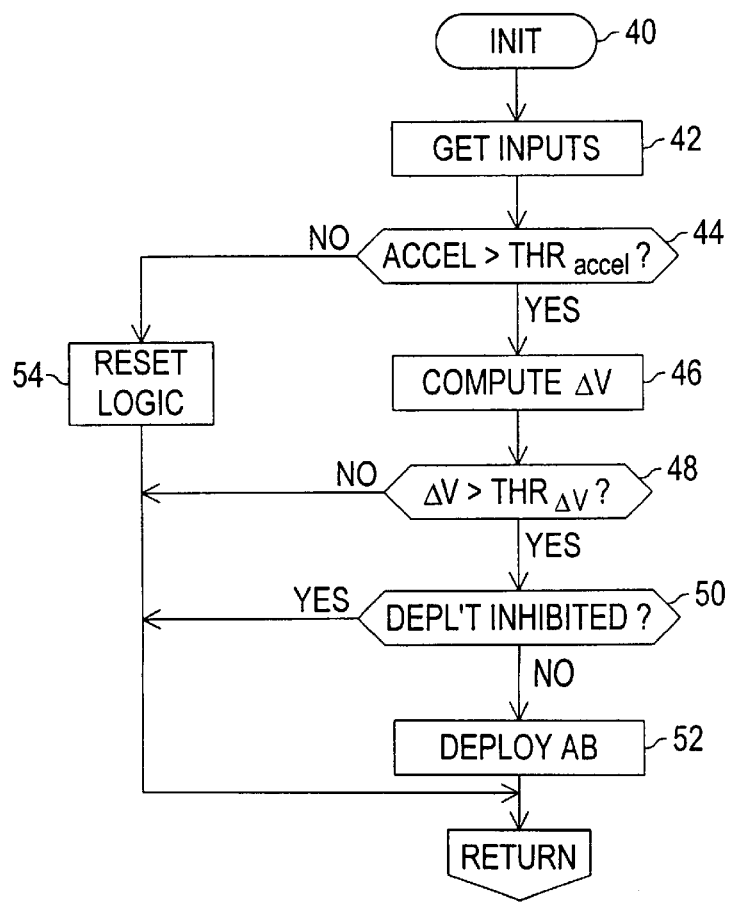
FIGS. 2 and 3 depict a flow diagram representative of computer program instructions performed by the microprocessor-based SDM of FIG. 1 in carrying out the control of this invention.
Figure 3:
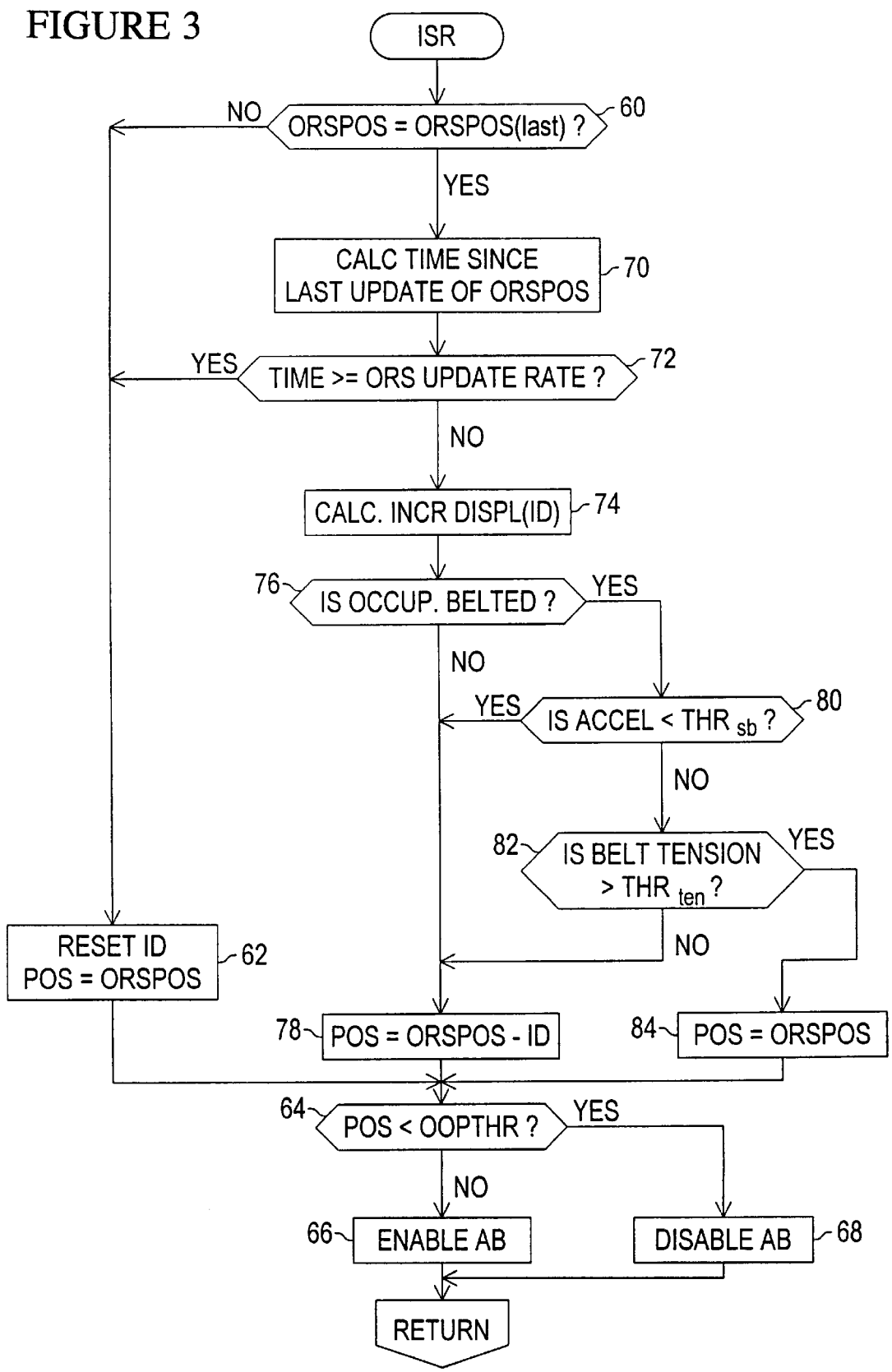

The flow diagrams of FIGS. 2–3 represent computer program instructions executed by the microprocessor $\mu$P in carrying out the functions attributed to microprocessor $\mu$P in the above discussion of FIG. 1. FIG. 2 is a main flow diagram, and FIG. 3 is an interrupt service routine (ISR) executed periodically (based on a timer interrupt, for example) to adjust the position output signal and to perform the OOP determination.

Referring to FIG. 2, the block 40 generally designates a series of initialization instructions for setting various terms and parameters to an initial state. For example, if the OOP status is indicated by a flag, the initialization instructions might be configured to initially disable deployment. Following initialization, the block 42 is executed to read the various input parameters such as the acceleration input ACCEL, the occupant position output signal (ORSPOS), the seat belt usage signal (SBU), and the belt tension signal (BT). If ACCEL exceeds threshold $THR_{accel}$, as determined at block 44, the deployment algorithm is enabled, and the blocks 46–52 are executed to determine if the restraints AB should be deployed. If ACCEL falls below $THR_{accel}$, the block 54 is executed to reset the deployment algorithm. The block 46 integrates ACCEL to form a change in velocity ($\Delta$V) signal, which is compared to a deployment threshold $THR_{\Delta V}$ at block 48. If $\Delta$V exceeds $THR_{\Delta V}$, the crash event warrants deployment of the restraint AB, and the block 50 is executed to determine if deployment is inhibited based on the OOP determination performed by the flow diagram of FIG. 3. If not, the block 52 is executed to trigger the firing circuit FC to deploy the restraint AB.

As indicated above, the flow diagram of FIG. 3 represents an interrupt service routine (ISR) which is periodically executed to update the status of the OOP or deployment inhibit flag. According to the invention, this involves adjusting the most recently updated value of the position output signal ORSPOS (last) if appropriate, and comparing the adjusted signal to a predefined threshold OOP THR.

The block 60 is first executed to determine if the most recent sample of the ORSPOS signal is different than the last sample ORSPOS (last). If so, ORSPOS has just been updated, and the block 62 is executed to reset the incremental displacement signal ID to zero and to set the occupant position term POS equal to the newest value of ORSPOS. The blocks 64–68 then compare POS to the threshold OOP THR, and appropriately enable (block 66) or disable (block 68) air bag deployment.

If the new value of ORSPOS is identical to the last value ORSPOS (last), as determined at block 60, the block 70 is executed to determine the time (TIME) since the last update of ORSPOS. If TIME is at least as great as the known update rate of the ORSPOS signal, as determined at block 72, the blocks 62–68 are executed as described above to reset ID to zero and perform OOP testing based on POS=ORSPOS. If TIME is less than the known update rate of ORSPOS, the block 74 is executed to update the incremental displacement signal ID. As indicted above, this involves a double integration of the acceleration signal ACCEL, which may be carried out mathematically according to the expression:

$$ID(t) = ID(t-1) + \int_{t-1}^{t}\int ACCEL(t)dt$$

where ID(t) is the incremental displacement at time (t), ID(t−1) is the incremental displacement computed in the last execution of the interrupt service routine, and ACCEL(t) is the measured acceleration at time (t). Various discrete solutions for carrying out the computation are well known in the art.

After updating the incremental displacement signal ID, the block 76 is executed to determine if the occupant 12 is belted, as determined by the status of the seat belt usage signal (SBU) generated by sensor 26. If not, the occupant 12 will be displaced in relation to the vehicle deceleration, and the block 78 is executed to adjust ORSPOS by the incremental displacement signal ID; that is, POS is set equal to (ORSPOS−ID). Then the blocks 64–68 are executed as described above to perform the OOP testing based on the new value of POS. If the SBU signal indicates that the occupant 12 is belted, the blocks 80 and 82 are executed to determine if the vehicle acceleration exceeds a threshold $THR_{sb}$ at which the seat belt system is supposed to positively engage, and if the BT signal indicates a belt tension in excess of a threshold $THR_{ten}$. If ACCEL is less than $THR_{sb}$, or BT is less than $THR_{ten}$, the blocks 78 and 64–68 are executed as described above to adjust ORSPOS by the incremental displacement signal ID, and to perform the OOP testing based on the new value of POS. However, if ACCEL is at least as great as $THR_{sb}$, and BT is greater than $THR_{ten}$, the occupant is being restrained by the belt system—in this case, the block 84 is executed to set POS equal to ORSPOS, and the blocks 64–68 are executed to perform the OOP testing based on the occupant position signal provided by the ORS 24.

In summary, the present invention provides a novel occupant position detection system and method that dynamically tracks the position of an occupant based on vehicle deceleration and other factors to provide significantly enhanced OOP determination for purposes of restraint deployment. It will be understood that the illustrated embodiment is intended to be exemplary in nature, and that various modifications will occur to those skilled in the art. For example, the functionality of the flow diagrams of FIGS. 2–3 could be performed by the CONTROLLER of ORS 24 instead of the microprocessor $\mu$P of SDM 22. As such, it will also be understood, that systems incorporating these and other modifications may fall within the scope of this invention, which is defined by the appended claims.

What is claimed is:

1. A vehicle restraint system in which a controller detects an out-of-position occupant of the vehicle based on a periodically updated occupant position signal, the vehicle including a seat belt system which may be engaged or disengaged, the improvement wherein the controller:

repeatedly determines an incremental displacement signal based on a measure of vehicle acceleration;

determines if the seat belt system is disengaged; and adjusts the periodically updated occupant position signal based upon the incremental displacement signal if it is determined that the seat belt system is disengaged.

2. The improvement of claim 1, wherein the seat belt system is designed to restrain the occupant when the vehicle acceleration exceeds a predetermined threshold, and wherein the controller additionally:

compares the measure of vehicle acceleration to said predetermined threshold; and adjusts the periodically updated occupant position signal based upon the incremental displacement signal if it is determined that the seat belt system is engaged and that the measure of vehicle acceleration is less than said predetermined threshold.

3. The improvement of claim 2, wherein the controller additionally:

determines a tension in the seat belt system if the measure of vehicle acceleration exceeds said predetermined threshold; and adjusts the periodically updated occupant position signal based upon the incremental displacement signal if it is determined that the seat belt system is engaged, that the measure of vehicle acceleration exceeds said predetermined threshold and that the tension in the seat belt system is less than a predetermined tension.

4. The improvement of claim 1, wherein the controller additionally:

determines a tension in the seat belt system; and adjusts the periodically updated occupant position signal based upon the incremental displacement signal if it is determined that the seat belt system is engaged and that the tension in the seat belt system is less than a predetermined tension.

5. The improvement of claim 1, wherein the controller:

determines the incremental displacement signal by double integrating the measure of vehicle acceleration.

6. The improvement of claim 5, wherein the controller:

resets the incremental displace signal to zero upon each update of the occupant position signal.

7. A method of operation for a vehicle restraint system in which an out-of-position occupant is detected based on a periodically updated occupant position signal, the vehicle including a seat belt system which may be engaged or disengaged, the method comprising the steps of:

repeatedly determining an incremental displacement signal based on a measure of vehicle acceleration;

determining if the seat belt system is disengaged; and adjusting the periodically updated occupant position signal based upon the incremental displacement signal if it is determined that the seat belt system is disengaged.

8. The method of operation of claim 7, wherein the seat belt system is designed to restrain the occupant when the vehicle acceleration exceeds a predetermined threshold, and the method includes the steps of:

comparing the measure of vehicle acceleration to said predetermined threshold; and adjusting the periodically updated occupant position signal based upon the incremental displacement signal if it is determined that the seat belt system is engaged and the measure of vehicle acceleration is less than said predetermined threshold.

9. The method of operation of claim 8, including the steps of:

determining a tension in the seat belt system if the measure of vehicle acceleration exceeds said predetermined threshold; and adjusting the periodically updated occupant position signal based upon the incremental displacement signal if it is determined that the seat belt system is engaged, that the measure of vehicle acceleration exceeds said predetermined threshold and that the tension in the seat belt system is less than a predetermined tension.

10. The method of operation of claim 7, including the steps of:

determining a tension in the seat belt system; and adjusting the periodically updated occupant position signal based upon the incremental displacement signal if it is determined that the seat belt system is engaged and that the tension in the seat belt system is less than a predetermined tension.

11. The method of operation of claim 7, wherein the incremental displacement signal is determined by double integrating the measure of vehicle acceleration.

12. The method of operation of claim 7, including the step of:

resetting the incremental displacement signal to zero upon each update of the occupant position signal.

* * * * *